(12) United States Patent
Kuranishi et al.

(10) Patent No.: US 8,557,750 B2
(45) Date of Patent: Oct. 15, 2013

(54) THREADED JOINT FOR PIPES

(75) Inventors: Takao Kuranishi, Nishinomiya (JP); Kunio Goto, Kobe (JP); Keishi Matsumoto, Takarazuka (JP)

(73) Assignees: Nippon Steel & Sumitomo Metal Corporation, Tokyo (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 108 days.

(21) Appl. No.: 13/244,987

(22) Filed: Sep. 26, 2011

(65) Prior Publication Data

US 2012/0025518 A1 Feb. 2, 2012

Related U.S. Application Data

(63) Continuation of application No. PCT/JP2010/056273, filed on Mar. 31, 2010.

(30) Foreign Application Priority Data

Mar. 31, 2009 (JP) ................... 2009-084623

(51) Int. Cl.
*C10M 169/04* (2006.01)
*C10M 143/00* (2006.01)

(52) U.S. Cl.
USPC .......................................... 508/110; 508/583

(58) Field of Classification Search
USPC .......................................... 508/591, 110, 583
See application file for complete search history.

(56) References Cited

U.S. PATENT DOCUMENTS

| | | | |
|---|---|---|---|
| 3,526,593 | A | 9/1970 | Oliveier |
| 4,915,856 | A | 4/1990 | Jamison |
| 2004/0239105 | A1 * | 12/2004 | Matsumoto et al. ............ 285/94 |
| 2006/0089274 | A1 * | 4/2006 | Sarkis et al. .................. 508/390 |

FOREIGN PATENT DOCUMENTS

| | | |
|---|---|---|
| EP | 1 350 834 | 10/2003 |
| JP | 02-117968 | 5/1990 |
| JP | 11-063132 | 3/1999 |
| JP | 11-223260 | 8/1999 |
| JP | 2002-173692 | 6/2002 |
| JP | 2003-021278 | 1/2003 |
| JP | 2003-042353 | 2/2003 |
| JP | 2003-327754 | 11/2003 |
| JP | 2006144038 A * | 6/2006 |
| JP | 2008-537062 | 9/2008 |

OTHER PUBLICATIONS

Thomson Scientific, London, GB, AN1990-089399 XP002685471, Sep. 7, 1989.
Thomson Scientific, London, GB, An 1984-105248 XP002685472, Jun. 2, 1981.

* cited by examiner

*Primary Examiner* — Jim Goloboy
(74) *Attorney, Agent, or Firm* — Clark & Brody

(57) ABSTRACT

A solid lubricating coating formed on a contact surface of a threaded joint for pipes has a matrix of a lubricating oil-containing polymer. The lubricating oil-containing polymer has either a uniform composition or a gradient composition in which the concentration of lubricating oil decreases towards the contact surface and in which there is substantially no lubricating oil in the vicinity of the contact surface.

13 Claims, 2 Drawing Sheets

THREADED JOINT FOR PIPES

TECHNICAL FIELD

This invention relates to a threaded joint for pipes which has a solid lubricating coating having a self-repairing ability and which is suitable for use in connecting oil country tubular goods (OCTG) to each other, and to a method for its manufacture. A threaded joint for pipes according to the present invention exhibits improved galling resistance and handling properties and can be used for pipe connection without application of liquid grease which has conventionally been applied to threaded joints for pipes. Accordingly, it can avoid the harmful effects on the global environment and working environment caused by use of liquid grease.

BACKGROUND ART

Oil country tubular goods such as tubing and casing used in the excavation of oil wells and gas wells have a length in the range of about 10 to 20 meters. At an excavation site, they are connected end to end by means of threaded joints until the connected length is sufficient to reach oil or gas (typically at least 2,000 meters). In recent years, in order to cope with an increased demand for energy, deeper oil wells are being developed, and nowadays oil wells having a depth of from 8,000 meters to 10,000 meters are not unusual. In addition, tubing through which fluid such as a crude oil runs is surrounded by a plurality of casing pipes having different diameters from each other. Therefore, the number of oil country tubular goods which are connected to each other during excavation of an oil well amounts to a huge number. Thus, threaded joints which connect an extremely large number of oil country tubular goods are exposed to a very severe environment of use, since they are subjected to an axial tensile force caused by the weight of the oil country tubular goods and couplings, if couplings are used for connection, combined internal and external pressures, and geothermal heat. Accordingly, threaded joints are required to have high performance capable of maintaining gastightness without undergoing damage even in such a severe environment.

During the process of lowering tubing or casing into an oil well, due to various problems, it is sometimes necessary to lift a threaded joint which has been once connected out of the oil well, disconnect it, reconnect it, and then relower it into the well. API (American Petroleum Institute) requires that so-called galling (unrecoverable severe seizing) not occur even if makeup (connection) and breakout (disconnection) are repeated ten times for a joint for tubing or three times for a joint for casing, which has a larger diameter than tubing and is more susceptible to galling.

A typical threaded joint for pipes used for connecting oil country tubular goods to each other has a pin-box structure. A pin is a joint component having male threads typically formed on the outer surface at each end of an oil country tubular good, and a box is a joint component having female threads typically formed on the inner surface of a coupling (a threaded connector).

In a threaded joint referred to as a premium joint which has superior gastightness, unthreaded metal contact portions are formed at the tip of the male threads of the pin and at the base portion of the female threads of the box. The unthreaded metal contact portions can include a metal seal portion formed on a cylindrical surface of the pin or the box, and a torque shoulder which is nearly perpendicular to the axial direction of the threaded joint.

When oil country tubular goods are connected to each other by such a premium joint, one end of an oil country tubular good, which constitutes a pin, is inserted into a coupling, which constitutes a box, and the male threads of the pin and the female threads of the box are tightened until the torque shoulder portions of the pin and the box are brought into contact with each other with a prescribed amount of interference. As a result, the metal seal portions of the pin and the box establish tight contact with each other with a certain interference to form a metal seal due to direct metal-to-metal contact and achieve gastightness.

The surfaces of the pin and the box which contact each other when a threaded joint is connected are hereunder referred to as contact surfaces. The contact surfaces include the threaded portions of the pin and the box (the portions having male threads and female threads, respectively) and the unthreaded metal contact portions thereof (namely, the metal seal portions and the torque shoulders of the pin and the box).

During makeup of a threaded joint, an extremely high pressure which may exceed the yield point of the material which constitutes the threaded joint is applied to the metal seal portions and the torque shoulders, namely, the unthreaded metal contact portions of the joint. Therefore, galling easily occurs particularly in the unthreaded metal contact portions of a threaded joint. In order to improve galling resistance and gastightness, a lubricant, particularly a viscous liquid grease (dope) called compound grease is generally applied to the threaded portions and the unthreaded metal contact portions, namely, the contact surfaces of a threaded joint before makeup of the joint. Compound grease also provides anticorrosive properties to the contact surfaces. With the intention of improving the retention of compound grease and the sliding properties achieved thereby, it is known to roughen the contact surfaces of a threaded joint by appropriate surface treatment (such as phosphate chemical conversion treatment or plating).

Compound grease contains large amounts of powders of relatively soft heavy metals such as zinc, lead, and copper in order to achieve the desired lubricating and anticorrosive properties. However, grease which has been applied to the contact surfaces of a threaded joint is squeezed out onto the exterior of the joint during makeup or washed off when the joint is recoated with compound grease prior to reconnection, and there is the possibility of its being discharged into soil or into the ocean, thereby producing harmful effects on the environment and especially on sea life. In addition, since application of compound grease to a threaded joint is carried out in the field whenever the joint is made up, use of compound grease worsens not only the working efficiency of makeup but also the working environment particularly due to the harmful effect of lead on humans. Therefore, there is need for development of a threaded joint capable of being made up without application of compound grease.

A threaded joint which can be used without application of compound grease and which has a solid lubricating coating formed on the contact surfaces was known in the art. For example, JP 09-72467 A1 (Patent Document 1) discloses a threaded joint having a lubricating resin coating in which molybdenum disulfide ($MoS_2$) or tungsten disulfide ($WS_2$) is dispersed.

Such a threaded joint having a solid lubricating coating greatly reduces harmful effects on the environment and humans compared to compound grease. Since a threaded joint is shipped after the solid lubricating coating is formed, application of a lubricating grease before makeup operations in the field can be eliminated, leading to an improvement in the working efficiency and working environment.

However, a solid lubricating coating of the type described above has poor ductility and fluidity, and it tends to easily peel off. Therefore, if an excessively high pressure is locally applied to a part of the threaded portions or unthreaded metal contact portions of a threaded joint during makeup to such an extent that it causes local plastic deformation, the solid lubricating coating in that part of the threaded joint peels off so that the naked metal surface is exposed. Even if the exposed area is small; it may instantly cause galling.

In contrast, when a liquid lubricant such as a lubricating grease including compound grease or lubricating oil which is liquid and fluid at room temperature is applied to the contact surfaces of a threaded joint, the lubricant retained in the gaps between male and female threads or in recesses due to surface roughness can seep out under the pressure exerted during makeup, so even if an excessive pressure is locally applied to a part of the contact surfaces of a threaded joint, the lubricant can move to that part and thereby prevent galling. This action is called the self-repairing ability of liquid lubrication. In general, the higher the fluidity (or the lower the viscosity) of a liquid lubricant, the higher is its self-repairing ability. Accordingly, as long as galling resistance is concerned, a liquid lubricating coating having fluidity is generally advantageous.

However, if a liquid lubricant is applied to the contact surfaces such as the threaded portions and unthreaded metal contact portions of a threaded joint at the time of shipping, the liquid lubricant makes the surfaces to which it is applied sticky, and foreign matter such as dust, sand, or debris easily tends to adhere to the contact surfaces. In particular, when oil country tubular goods are stood upright during assembly in the field, rust flakes and blasted grains fall along the walls of the tubular goods. If the contact surfaces are sticky, a large amount of such foreign matter adheres to the surfaces. As a result, even if a lubricating grease which is expected to exhibit a self-repairing ability is applied, its lubricity is significantly deteriorated, and galling may easily occur when makeup and breakout are repeated. Namely, from the standpoint of adhesion of foreign matter, a solid lubricating coating having a dry surface is advantageous.

US 2004/0239105 A1 (Patent Document 1) discloses a threaded joint having contact surfaces coated with a lower liquid grease layer and an upper solid lubricating layer. With this threaded joint, the above-mentioned problems of a solid lubricating coating and a liquid grease are both alleviated so as to attain the advantages of these two types of lubricating coatings at the same time. However, due to the presence of a liquid grease as a base layer, the amount of reduction in surface stickiness is inadequate. In addition, due to the very soft nature of the layered coating, if the coating is struck by an object, it is readily deformed or it is removed and adheres to the object, thereby reducing the effect of the coating.

JP 11-63132 A1 (Patent Document 2) and JP 11-223260 A1 (Patent Document 3) disclose that a member made of a lubricating oil-containing polymer (also called an oil-impregnated polymer) is disposed in the vicinity of a ball screw or bearing which needs lubrication such that lubricating oil is continuously supplied by seepage from that member.

A lubricating oil-containing polymer is a solid material consisting of a lubricating oil and a thermoplastic organic polymer which are mutually dissolved so as to form a single phase. A polyolefin resin in particular can contain a large amount of a lubricating oil. In particular, hers a combination of a polyethylene and mineral oil can contain as much as 70% of lubricating oil (mineral oil). A lubricating oil contained or impregnated in a polymer can exert its lubricating effect by moving from the inside toward the surface to seep out under the action of factors such as pressure, temperature rise, and the like. Such a lubricating oil-containing polymer can be manufactured by heating to melt a mixture of starting substances which are an organic polymer and a lubricating oil, casting the resulting melt in a mold, and then cooling the mixture in the mold under pressure until the melt solidifies.

Patent Document 1: US 2004/0239105 A1
Patent Document 2: JP 11-63132 A1
Patent Document 3: JP 11-223260 A1

DISCLOSURE OF INVENTION

An object of the present invention is to provide a threaded joint for pipes which has a non-tacky (dry) surface and which can exhibit good lubricating properties even when subjected to an extremely high surface pressure at the time of makeup of oil country tubular goods and which has extremely good galling resistance.

A more specific object of the present invention is to provide a threaded joint for pipes having a lubricating coating which has increased galling resistance due to using a solid lubricating coating as a base to avoid surface tackiness and which exhibits a self-repairing ability like that of a liquid grease.

The present inventors conceived the idea that the above-described objects can be achieved by using the above-described lubricating oil-containing polymer to form a lubricating coating of a threaded joint for pipes. A lubricating oil-containing polymer is a solid at room temperature and at atmospheric pressure prior to makeup of a threaded joint, and it does not experience oozing of lubricating oil. Therefore, its surface is dry, and foreign material does not readily adhere to it. On the other hand, at the time of makeup of a threaded joint, due to high temperatures and high pressures caused by friction during makeup, the liquid component (lubricating oil) of the coating oozes out. Therefore, even though the coating is a solid, it can exhibit a self-repairing ability. Thus, the coating can be expected to provide the advantages of both a solid lubricating coating and a liquid grease.

However, most of conventional lubricating oil-containing polymers are used as an independent member such as a sheet which is formed by being forced into a mold, and this technique for forming the member cannot be applied without modification to a lubricating coating for a threaded joint for pipes. This is because a lubricating oil-containing polymer has low adhesion to a metal substrate, so even if it is applied to a contact surface of a threaded joint for pipes as a lubricating coating, when the coating is subjected to a high pressure at the time of makeup of a threaded joint, the coating experiences a large amount of peeling. Therefore, it is expected that the effect of the coating on improving galling resistance by a self-repairing ability would be significantly decreased.

The present inventors found that a solid lubricating coating of a lubricating oil-containing polymer in which a polymer and a lubricating oil are completely dissolved in each other can be formed on a contact surface of a threaded joint by applying a liquid mixture containing a powder of a thermoplastic polymer and particularly a polyolefin such as polyethylene, which is a raw material of a lubricating oil-containing polymer, and a lubricating oil to the contact surface of the threaded joint for pipes and then heating the contact surface to a temperature higher than the melting point of the thermoplastic polymer.

However, as expected, the resulting solid lubricating coating which is formed has low adhesion to the substrate, and it easily peels off when it is subjected to a high pressure. As a result of further study, it was found that by using a polyolefin which has been modified so as to have a polar group (such as an ethylene-vinyl acetate copolymer referred to as EVA) as a thermoplastic polymer, a solid lubricating coating of a lubricating oil-containing polymer having sufficient adhesion can be obtained.

It was also found that if the lubricating oil-containing polymer constituting the solid lubricating coating is given a gradient composition (or a composition gradient) which unidirectionally varies in the thickness direction of the coating so that the concentration of the lubricating oil decreases as the distance from the substrate (the contact surface of the threaded joint on which the coating is formed) decreases and increases as the distance from the substrate increases (in other words, so that the polymer concentration increases as the distance from the substrate decreases), a solid lubricating coating having sufficient adhesion can be formed from a lubricating oil-containing polymer even if the polymer is an unmodified polyolefin having no polar group, such as polyethylene.

A solid lubricating coating of a lubricating oil-containing polymer having such a gradient composition can be formed by first forming a polymer coating which does not contain a lubricating oil, then applying a lubricating oil atop the polymer coating, and then heating the polymer coating to at least the melting point of the polymer to dissolve the lubricating oil in the polymer.

The present invention is a threaded joint for pipes comprising a pin and a box each having a contact surface including a threaded portion and an unthreaded metal contact portion and characterized in that:

(1) the contact surface of at least one of the pin and the box is at least partially coated with a solid lubricating coating having a matrix of a lubricating oil-containing polymer formed from a polyolefinic polymer which is a modified polyolefin containing polar groups and a lubricating oil, the polymer and oil being dissolved in each other and forming a coating having a uniform composition, or (2) the contact surface of at least one of the pin and the box is at least partially coated with a solid lubricating coating having a matrix of a lubricating oil-containing polymer formed from at least one polyolefinic polymer selected from a polyolefin and a modified polyolefin and a lubricating oil which are dissolved in each other and form a coating having a gradient composition (or a composition gradient) in which the composition varies in the thickness direction of the coating such that the concentration of the lubricating oil in the coating decreases as the distance from the contact surface on which the coating is formed decreases.

In the present invention, the word "polymer" by itself refers to a polymer component of a lubricating oil-containing polymer and does not refer to the lubricating oil-containing polymer.

Preferred embodiments of a threaded joint for pipes according to the present invention includes the following.

The polyolefin is polyethylene, and the modified polyolefin is a polyethylene which has been modified by copolymerization with a vinyl monomer having a polar group selected from a carboxyl group, an ester group, and a hydroxyl group.

The solid lubricating coating contains one or more additives selected from an anticorrosive additive, an antioxidant, an extreme pressure agent, a wear reducing agent, and a lubricating powder.

The contact surface which is at least partially coated by the solid lubricating coating has been subjected to preparatory surface treatment by a method selected from pickling, blasting, impact plating with zinc or a zinc alloy, metal plating, phosphate treatment, and oxalate treatment.

A threaded joint for pipes according to the present invention having above-described characteristic (1) can be manufactured by a method including applying a liquid coating composition comprising a lubricating oil and a modified polyolefin containing polar groups to a contact surface of a threaded joint for pipes, thereby forming a solid lubricating coating having a matrix of a lubricating oil-containing polymer with a uniform composition in which a lubricating oil and a polymer are dissolved in each other.

In a preferred method, the liquid coating composition to be applied contains a lubricating oil and a powder of the above-described polymer (a modified polyolefin). After application of the composition, the contact surface of the threaded joint to which the composition is applied is heated to a temperature which is not lower than the melting point of the polymer to form a solid lubricating coating. As another method, a modified polyolefin containing polar groups which is used as a polymer is dispersed in a suitable solvent, and the resulting dispersion is mixed with a lubricating oil to form a liquid coating composition to be applied to a contact surface of a threaded joint. After application of the liquid coating composition, the contact surface is heated in the same manner as described just above.

A threaded joint for pipes according to the present invention having above-described characteristic (2) can be manufactured by a method in which a coating of a polyolefinic polymer selected from a polyolefin and a modified polyolefin is formed on a contact surface of a threaded joint for pipes, a lubricating oil is applied atop the polymer coating, and the threaded joint is heated to a temperature of at least the melting point of the polymer to dissolve the lubricating oil in the polymer coating and form a solid lubricating coating having a gradient composition in the thickness direction of the coating in which the concentration of the lubricating oil decreases as the distance from the contact surface on which the coating is formed decreases.

The polymer coating can be formed by a conventional coating method such as spray coating using a coating composition comprising a polymer in powder form dispersed in a suitable solvent. Alternatively, since the polymer is thermoplastic, instead of using a solvent, a method in which the polymer in a molten state is applied to a preheated substrate, or a powder coating method can be employed.

When the solid lubricating coating contains one or more additives selected from an anticorrosive additive, an antioxidant, an extreme pressure agent, a wear reducing agent, and a lubricating powder, the additive can be contained in the composition to be applied.

In a threaded joint for pipes according to the present invention, a solid lubricating coating on a contact surface of a threaded joint is an essentially solid or dry coating formed from a lubricating oil-containing polymer. Therefore, at room temperature and atmospheric pressure, lubricating oil does not ooze out of the solid lubricating coating, and the coating surface has a dry feeling with little or no tackiness. Accordingly, foreign material such as sand, dust, or blasting particles does not adhere to the coating surface, and galling caused by such foreign material can be prevented.

On the other hand, this solid lubricating coating also has the characteristic that lubricating oil oozes out from the coating when pressure is applied. Accordingly, due to high temperatures and high pressures caused by friction at the time of makeup of a threaded joint, the liquid component (lubricant oil) oozes out of the coating, and the coating exhibits a self-repairing ability in the same manner as liquid grease. Therefore, even if the solid lubricating coating peels off to a certain extent, the metal surface (the contact surface of a threaded joint on which the coating is formed) can be protected by the oil which oozes out, and the galling resistance of a threaded joint is markedly increased.

MODES FOR CARRYING OUT THE INVENTION

Below, the present invention will be explained in greater detail with respect to embodiments. In the following explanation, unless otherwise specified, % indicates mass %.

Figure 1:
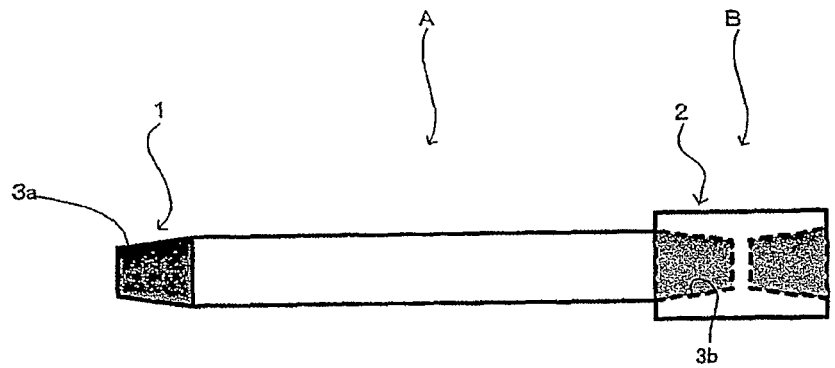
FIG. 1 schematically shows the assembled state of a threaded joint for pipes at the time of shipment of a steel pipe and a coupling.

FIG. 1 schematically illustrates the structure of a typical threaded joint in an assembled state, showing the state of a steel pipe for an oil country tubular good and a coupling assembled for shipment. A steel pipe A has a pin 1 formed at both ends of the pipe. The pin 1 has male threads 3a on its outer surface. A coupling B has a box 2 at both of its ends, and the box 2 has female threads 3b on its inner surface. A pin means the component of a threaded joint having male threads, and a box means the other component of a threaded joint having female threads. The coupling B is previously connected to one end of the steel pipe A. Although not shown, the unconnected pin of the steel pipe A and the unconnected box of the coupling B each have a protector mounted thereon prior to shipment for protecting the threads. The protectors are removed before use of the threaded joint.

Typically, as shown in this figure, a pin is formed on the outer surface of both ends of a steel pipe and a box is formed on the inner surface of a coupling, which is a separate member from the pipe. Conversely, it is theoretically possible for the inner surface of both ends of a steel pipe to be a box and for the outer surface of a coupling to be a pin. There are also integral threaded joints which do not use a coupling and in which one end of a steel pipe is made a pin and the other end is made a box. The present invention can be applied to any such types of threaded joints.

Figure 2:
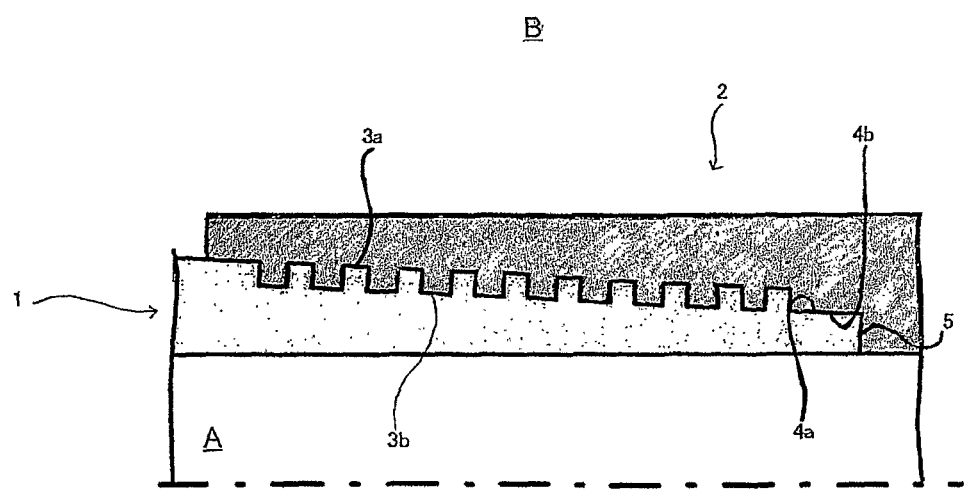
FIG. 2 schematically shows the connecting portions of the threaded joint of FIG. 1.

FIG. 2 schematically illustrates the structure of a typical threaded joint for pipes (referred to below simply as a threaded joint). The threaded joint comprises a pin 1 formed on the outer surface of the end portion of a steel pipe A and a box 2 formed on the inner surface of a coupling B. The pin 1 has male threads 3a, a sealing surface 4a positioned at the tip of the pipe A, and a shoulder surface 5a which is the end face of the pipe. Correspondingly, the box 2 has female threads 3b, a sealing surface 4b on the inner side of the threads 3b, and a shoulder surface which abuts the shoulder surface 5b of the pin 1. The sealing surfaces and the shoulder surfaces of the pin and the box constitute unthreaded metal contact portions of the threaded joint.

The threads 3a, 3b, the sealing surfaces 4a and 4b, and the shoulder surfaces 5a, 5b of the pin 1 and the box 2 constitute contact surfaces of the threaded joint. The contact surfaces need to have galling resistance, gastightness (resistance to leaks), and corrosion resistance. In the past, for this purpose, a dope containing heavy metal powders and referred to as a compound grease was usually applied to threaded joints before makeup, but use of such dope is now regulated.

[Solid Lubricating Coating]

In a threaded joint according to the present invention, the contact surface of at least one of the pin and the box is at least partially coated with a solid lubricating coating having a matrix of a lubricating oil-containing polymer. As stated earlier, this solid lubricating coating is dry and not tacky at room temperature and atmospheric pressure. However, during makeup of a threaded joint, a liquid component (lubricating oil impregnated in the polymer) oozes out of the coating at high temperatures and high pressures caused by friction, whereby the coating exhibits a self-repairing ability in the same manner as a liquid grease, and galling can be prevented.

The matrix of the solid lubricating coating is a lubricating oil-containing polymer comprising a lubricating oil and a polyolefinic polymer, which is a thermoplastic resin. These two components are dissolved in each other to form a single phase. Dissolving in each other means that the lubricating oil and the polymer have sufficient affinity for each other to completely intermix with each other and form a single phase. In other words, a phase consisting solely of the polymer which is a solid material at room temperature does not exist. Accordingly, the lubricating oil and the polymer are selected so as to have affinity for each other and dissolve in each other.

The lubricating oil is selected from ones that exhibit a lubricating effect under the makeup conditions of oil country tubular goods. Examples of lubricating oils which can be used are paraffinic hydrocarbon oils such as poly ($\alpha$-olefin) oil, naphthenic hydrocarbon oils, mineral oil, ether oils such as dialkyl diphenyl ether, and ester oils such as phthalate esters or trimellitate esters. One or more of these oils can be used. A particularly preferred lubricating oil is mineral oil since a large amount thereof can be dissolved in a polyolefinic polymer and because it is relatively inexpensive.

The polymer is selected from polyolefinic polymers, which have conventionally been used in lubricating oil-containing polymers. Among polyolefinic polymers, polyethylene and modified polyethylenes are preferred. As stated above, polyolefins and particularly polyethylene can absorb and contain an extremely large amount of a lubricating oil such as mineral oil. Thus, the polymer and the lubricating oil can form a single-phase composition in which the lubricating oil and the polymer are dissolved in each other, while the content of the lubricating oil in the composition can be varied over a wide range, thereby making it possible to adjust the properties such as the lubricating ability of the composition. In addition, polyethylene is advantageous in that the flexibility of the coating which is formed is highest among polyolefins.

As stated above, when a lubricating oil-containing polymer which forms a matrix of a solid lubricating coating has a uniform composition, adhesion of the coating to a contact surface of a threaded joint which is a substrate to be coated decreases due to the lubricating oil in the coating. As a result, it becomes easy for the coating to peel off, and it becomes difficult to obtain a desired lubricating ability. Accordingly, in order to improve the adhesion of the coating, a modified polyolefin having polar groups is used as the polymer component in the lubricating oil-containing polymer.

On the other hand, when a lubricating oil-containing polymer has a gradient composition in which the composition unidirectionally varies in the thickness direction of the coating so that the concentration of the lubricating oil decreases towards a substrate (a contact surface of a threaded joint) and the concentration of the lubricating oil increases in the direction away therefrom, even if the polymer in the lubricating oil-containing polymer is an unmodified polyolefin, the adverse effect on adhesion of the coating due to the presence of a lubricating oil can be substantially eliminated. Accordingly, in the case of a solid lubricating coating having such a gradient composition, the polyolefinic polymer component in the lubricating oil-containing polymer can be either an unmodified polyolefin or a modified polyolefin. A modified polyolefin which does not contain polar groups can also be used.

Below, the present invention will be explained for the case in which the polyolefinic polymer is polyethylene or a modified polyethylene which contains polar groups. However, it is possible to use another polyolefin such as polypropylene or another modified polyolefin containing polar groups instead of or in addition to polyethylene or a modified polyethylene containing polar groups.

(1) The Case in which the Lubricating Oil-Containing Polymer has a Uniform Composition:

The matrix of a solid lubricating coating is formed from a lubricating oil-containing polymer having a uniform composition in which a modified polyethylene containing polar groups and a lubricating oil (preferably mineral oil) are dissolved in each other. Although various modified polyethylenes containing polar groups (broadly speaking, modified polyolefins containing polar groups) are known in the art, in the present invention, it is preferable to use a modified polyethylene which is modified so as to contain polar groups such as carboxyl groups, hydroxyl groups, or ester groups by copolymerization with a vinyl monomer containing any of these polar groups, namely, an ethylene copolymer with such a vinyl monomer. It is also possible to use a modified polyethylene containing polar groups having a higher polarity such as a sulfonic acid group. However, such a polar group with a higher polarity has the drawback that it makes a coating corrosive.

Examples of modified polyethylenes containing polar groups which are suitable for use in the present invention are EVA (ethylene-vinyl acetate copolymer), EEA (ethylene-ethyl acrylate copolymer), EMA (ethylene-methyl acrylate copolymer), and EVOH (ethylene-vinyl alcohol copolymer). It is also possible to use a mixture of such a modified polyethylene containing polar groups and an unmodified polyethylene. In addition, it is possible to intermix a thermoplastic polymer other than a polyolefin such as a styrene polymer if it is used in a small amount of at most 10% of the overall amount of polymers.

A modified polyethylene containing polar groups which is used in a lubricating oil-containing polymer preferably contains 5-30% of a vinyl monomer containing a polar group. Namely, it is preferably a copolymer of 5-30% of a vinyl monomer containing a polar group and 95-70% of ethylene. Compared to the case when using an unmodified polyethylene not containing a polar group, the adhesion of a solid lubricating coating can be markedly increased, whereby peeling of the coating can be suppressed and galling resistance can be increased. The proportion of the vinyl monomer containing a polar group in the copolymer is more preferably 10-20%. When used together with an unmodified polyethylene (and/or other polymer), the molar ratio of the vinyl monomer containing a polar group with respect to the total amount of polymers (the total number of moles of the modified polyethylene and the unmodified polyethylene and other polymers on a monomer basis) is preferably made to be within the range of 5-30%.

The proportions of the polymer (A) and the lubricating oil (B) in the lubricating oil-containing polymer are preferably such that the mass ratio A:B is in the range of 30:70-90:10. In this range, there is almost no oozing of oil when a coating is formed, and it is possible to form a solid lubricating coating having little or no tackiness. If the amount of the polymer is too large, the lubricating ability and accordingly the galling resistance of the coating decrease. If the amount of the polymer is too small, the tackiness of the coating increases and the adhesion of the coating decreases, leading to a decrease in galling resistance. This mass ratio is more preferably in the range of 40:60-80:20.

(2) The Case in which the Lubricating Oil-Containing Polymer has a Gradient Composition When the matrix of a solid lubricating coating is formed from a lubricating oil-containing polymer having a gradient composition such that the proportion of the lubricating oil decreases (in other words, the proportion of the polymer increases) in the thickness direction of the solid lubricating coating towards a contact surface of a threaded joint which is the coated substrate, it is possible to avoid the adverse effects of the lubricating oil on the adhesion of the coating. Therefore, the polymer component of the lubricating oil-containing polymer can be either an unmodified polyethylene or the above-described modified polymer or both. Namely, the polymer can be solely an unmodified polyethylene or a modified polyethylene, or it may be a blend of an unmodified polyethylene and a modified polyethylene. In this case as well, it is possible to intermix other thermoplastic polymers such as a styrene polymer in a small amount of not greater than 10% of the total amount of the polymers.

The proportions of the polymer (A) and the lubricating oil (B) in the lubricating oil-containing polymer having the above-described gradient composition is preferably such that the amount of polymer is larger than for the case of the above-described uniform composition (1) as a proportion of the overall coating. Preferably the mass ratio A:B in this case is in the range of 50:50-90:10.

In the case of a gradient composition, in the lowermost region of a solid lubricating coating adjoining a contact surface of a threaded joint, the proportion of the lubricating oil (B) in the lubricating oil-containing polymer is preferably less than 1%. In other words, the proportion of the polymer (A) in this region is preferably at least 99%. By keeping this proportion, even if the polymer in the lubricating oil-containing polymer is an unmodified polyethylene, a solid lubricating coating having excellent adhesion of substantially the same level as a coating formed solely from an unmodified polyethylene (not containing a lubricating oil) can be formed, and the adverse effect on adhesion of the lubricating oil in the coating can be avoided.

In the uppermost region of a lubricating coating remote from the contact surface (substrate) on which the coating is formed (the side which contacts the contact surface of the opposing member (the pin or the box) of the threaded joint), the proportion of the lubricating oil in the lubricating oil-containing polymer is much higher so that oozing of lubricating oil from the coating will occur more easily to improve the lubricating ability.

It can be ascertained whether the solid lubricating coating has the above-described gradient composition by physical quantitative analysis of a cross section of the coating using a SEM (scanning electron microscope)-EPMA (electron probe microanalyzer) or the like.

The proportion of the lubricating oil in the lubricating oil-containing polymer in the surface region of the solid lubricating coating within 1 μm in the thickness direction of the outer surface of the solid lubricating coating is preferably at most 70%. If this proportion is too high or if the coating is 100% lubricating oil in this region, the surface of the solid lubricating coating becomes very tacky. However, in this case, tackiness of the surface of the solid lubricating coating can be eliminated or decreased by coating the solid lubricating coating with a resin layer.

Such a resin layer can be formed from an appropriate resin such as a thermoplastic resin, a thermosetting resin, or an ultraviolet curable resin. From the standpoint of minimizing the effect of the resin layer on lubricating ability, the thickness of the resin layer is preferably as thin as possible as long as the resin layer is effective at suppressing tackiness. For example, the thickness can be made 5-50 μm and preferably 10-40 μm. This type of resin coating layer is disclosed in WO 2006/104251, which is incorporated herein by reference.

In either of above-described cases (1) and (2), the thickness of the solid lubricating coating is preferably in the range of 20-100 μm and more preferably in the range of 40-60 μm. If the coating is too thin, the improvement in galling resistance which it provides is inadequate, and if it is too thick, torque increases and peeling of the solid lubricating coating tends to easily occur.

If desired, the solid lubricating coating in either of cases (1) or (2) may contain one or more additives selected from an anticorrosive additive, an antioxidant, an extreme pressure agent, a wear reducing agent, and a lubricating powder. These additives can be dispersed in the form of a powder in the lubricating oil-containing polymer forming the matrix of the coating, or they can be dissolved in the matrix. Examples of suitable additives which can be employed are disclosed in the book entitled "Physics of Lubricants" by Toshio Sakurai, published by Saiwai Shobo, which is herein incorporated by reference.

More specifically, examples of an anticorrosive additive include alkenyl succinic acid derivatives, metal soaps, and the like. Examples of an antioxidant include DBPC (2,6-di-tert-butyl para-cresol) and M-DTP (metal dialklyl dithiophosphate). Examples of an extreme pressure agent include sulfur- or phosphorus-based compounds. Examples of a lubricating powder include powders of molybdenum disulfide, tungsten disulfide, graphite, mica, boron nitride, polytetrafluoroethylene, and the like. The content of an additive may be the same as the content which has conventionally been used and as described in the above book. The suitable amount depends upon the type of additive.

The above-described solid lubricating coating can be formed on the contact surfaces of both the pin and the box of a threaded joint for pipes, but normally a satisfactory improvement in galling resistance can be achieved if it is formed on the contact surface of only one of either the pin and the box. In this case, it is generally easier to form the solid lubricating coating on the contact surface of the box, which is typically formed on a short coupling. It is preferable to form the above-described solid lubricating coating on the entire contact surface of whichever member (the pin and/or the box) on which the coating is formed, but the present invention includes the case in which the solid lubricating coating is formed only on a portion of a contact surface.

[Manufacture of a Threaded Joint for Pipes]

Next, a method of manufacturing a threaded joint for pipes according to the present invention will be explained for the case in which the lubricating oil-containing polymer of the solid lubricating coating has a uniform composition and for the case in which it has a gradient composition.

In the following explanation, the present invention will be explained for the case in which the polymer is a polyethylene or a modified polyethylene containing polar groups. However, it is possible to use another polyolefin such as polypropylene or another modified polyolefin containing polar groups instead of or in addition to polyethylene or a modified polyethylene containing polar groups.

(1) The Case in which the Lubricating Oil-Containing Polymer has a Uniform Composition:

A solid lubricating coating of a lubricating oil-containing polymer having a uniform composition can be formed by a method including applying a liquid coating composition comprising a lubricating oil and a modified polyethylene containing polar groups to a contact surface of a threaded joint. The solid lubricating coating which is formed has as a matrix a lubricating oil-containing polymer having a uniform composition in which the lubricating oil and the modified polyethylene containing polar groups are dissolved in each other.

The liquid coating composition used for coating can be either of below-described (A) and (B):

(A) A composition containing a powder of a modified polyethylene containing polar groups in a lubricant oil, namely, a composition which does not contain a solvent and which is formed by dispersing a powder of a modified polyethylene containing polar groups in a lubricating oil, or (B) A composition formed by dispersing a powder of a modified polyethylene containing polar groups in a solvent and then mixing the resulting dispersion with a lubricating oil.

In either case, it is possible to use an unmodified polyethylene or other thermoplastic polymer in addition to a modified polyethylene containing polar groups.

In case (A), after applying the liquid coating composition to a contact surface of a threaded joint, the contact surface is heated to a temperature of not lower than the melting point of the modified polyethylene which is used (and that of other polymers if used; the same applies below) so as to melt the polymer and cause the polymer and the lubricating oil to dissolve in each other and form a homogeneous mixture. Accordingly, the heating conditions (the heating temperature and the heating time) are set so that the polymer and the lubricating oil completely dissolve in each other. Cooling is then performed to room temperature to obtain a solid lubricating coating having a matrix of a lubricating oil-containing polymer which has a uniform composition in which a polymer and a lubricating oil are dissolved in each other and which has a non-tacky surface on a contact surface of a threaded joint for steel pipes.

The powder of the modified polyethylene containing polar groups preferably has an average particle diameter smaller than 1000 μm (=1 mm). For example, spheroidized polymer in the form of beads or granules can be used. These are considered to be a powder in the present invention. The liquid coating composition which is used may contain one or more additives selected from the above-described additives, namely, an anticorrosive additive, an antioxidant, an extreme pressure agent, a wear reducing agent, and a lubricating powder.

The liquid coating composition can be applied to a contact surface by usual methods such as spraying or brush coating. At the time of applying the coating composition, the lubricating oil and the polymer are not dissolved in each other, so the surface of the coating is wet and tacky. However, as a result of the subsequent heating and cooling, the lubricating oil and the organic polymer are completely mixed with or dissolved in each other to form a homogeneous and uniform composition, namely a lubricating oil-containing polymer, and the surface of the resulting coating is dry. The coating composition prepared by mixing raw materials (the modified polyethylene and the lubricant) forms a viscous fluid, so there is a concern that the applied coating may run down during heating, but this phenomenon was not observed in actual practice.

It can be ascertained from an SEM image of the coating that the polymer and the lubricating oil are completely dissolved in each other and form a homogeneous single phase in the coating. If heating is inadequate and the raw materials are not completely dissolved in each other, particles of the polymer are observed in an SEM image. When the raw materials are completely dissolved in each other, polymer particles disappear.

By heating the contact surface of a threaded joint to which the liquid coating composition is applied or the interface of the threaded joint with the coating to at least the melting point of the polymer, a solid lubricating coating having good adhesion to the contact surface can be formed after cooling. Accordingly, heating is preferably carried out by heating the entire member of the threaded joint having a contact surface to which the liquid coating composition is applied in a heating furnace, or by heating from the back side of the threaded joint facing away from the coated contact surface when heating is carried out with hot air. If the coated contact surface is heated with hot air, the polymer particles are sometimes blown off from the contact surface of the threaded joint before they melt, and the adhesion of the resulting coating decreases.

In above-described case (B) using a solvent, application of a coating composition and subsequent heating may be carried out in the same manner as for above-described (A). Examples of solvents suitable for use in the present invention to disperse a polymer powder include chlorine-based solvents such as dichloromethane, ketones such as acetone, and the like.

(2) The Case in which the Lubricating Oil-Containing Polymer has a Gradient Composition In order to form a solid lubricating coating having a matrix of a lubricating oil-containing polymer with a gradient composition in which the concentration of the lubricating oil decreases towards the substrate (the contact surface of a threaded joint) on which the coating is formed, first, a solid coating is formed from the polymer component, namely, from at least one polymer selected from a polyethylene and a modified polyethylene. This solid coating can be formed using a liquid coating composition prepared by mixing a polymer and a solvent, but it is also possible to carry out coating, without using a solvent, by a coating method using a polymer alone in the form of a powder or in a molten state, for example by powder coating, frame spray coating, or hot melt coating using a spray gun.

When using a solvent, a dispersion containing the polymer dispersed in the solvent is applied. The dispersion can be applied by usual methods such as brush coating or spraying.

The polymer which is used can be an unmodified polyethylene, a modified polyethylene, or a mixture of a modified polyethylene and an unmodified polyethylene. A modified polyethylene may be a polyethylene which is modified by copolymerization with a monomer either having or not having a polar group, or it may be a polyethylene which is modified by a method other than copolymerization. Again, a small amount of a thermoplastic polymer other than a polyethylene (or other than a polyolefin) can be used in combination therewith in a small amount of not greater than 10% of the total amount of the polymers.

Whichever coating method is employed, the coating thickness increases by subsequently applying a lubricating oil atop the polymer coating which is formed. Accordingly, the thickness of the polymer coating is determined so that the final coating thickness after application of the lubricating oil atop the polymer coating and subsequent heating to dissolve the lubricating oil and the polymer in each other becomes an appropriate value. As described above, the final coating thickness is preferably in the range of 20-100 μm and more preferably in the range of 40-60 μm.

When the solid lubricating coating contains one or more additives selected from an anticorrosive additive, an antioxidant, an extreme pressure agent, a wear reducing agent, and a lubricating powder, these additives are contained in the liquid coating composition or the polymer material which is used to form the polymer coating.

After a polymer coating not containing a lubricating oil is formed, a lubricating oil is applied to this polymer coating. Heating is then performed to melt the polymer coating, and the polymer in the coating and the lubricating oil applied atop it are dissolved in each other. The heating temperature is at least the melting temperature of the polymer and at most the boiling point of the lubricating oil. The applied amount of lubricating oil is as described previously.

As a result of this heating, the lubricating oil is gradually absorbed by and dissolved in the lower layer which is a molten polymer coating, so the lubricating oil in the coating has a concentration gradient in the thickness direction of the coating. If heating is further continued, the lubricating oil reaches the lowermost portion of the coating, and the coating composition eventually becomes substantially uniform. In the present invention, heating is preferably terminated before the lubricating oil reaches the bottommost portion of the coating so that the concentration of the lubricating oil in the bottommost portion of the coating (the portion adjoining the contact surface of the threaded joint on which the coating is formed) is less than 1%. The heating conditions for this purpose can be determined by experiment by a person skilled in the art.

When the heated coating is then cooled to room temperature, a solid lubricating coating having a gradient composition of the lubricating oil-containing polymer is formed. In this coating, the proportions of the lubricating oil and the polymer in the thickness direction of the coating gradually change so that the concentration of lubricating oil decreases towards the substrate (the contact surface of a threaded joint).

In the surface region of the solid lubricating coating which is formed (in this case as well, the surface region of the coating is the region up to a thickness of 1 μm in the thickness direction from the surface), if a considerable amount of the polymer is dissolved in the lubricating oil, the coating surface is not tacky. However, if the concentration of the polymer in the surface region of the coating is low or if the surface region of the coating consists essentially of lubricating oil, the surface of the solid lubricating coating becomes tacky. As stated above, due to this tackiness, it becomes easy for foreign matter to adhere to the contact surface of a threaded joint for pipes, resulting in a decrease in galling resistance.

Therefore, when the surface of the solid lubricating coating is tacky, a resin layer is preferably formed as an upper layer so as to cover the solid lubricating coating. The thickness of the upper resin layer is preferably in the range of 5-50 μm and more preferably in the range of 10-40 μm. The resin layer can be formed from an appropriate resin such as a thermoplastic resin, a thermosetting resin, or an ultraviolet light curable resin, with an ultraviolet light curable resin being preferred. A resin layer of a ultraviolet curable resin can be formed from a coating composition comprising a monomer, an oligomer, and a photopolymerization initiator. There are no particular limitations on the formulation of the coating composition as long as a cured coating can be formed by irradiation with ultraviolet light to cause a photopolymerization reaction.

Examples of useful monomers include, but are not limited to, di- or higher esters of a polyhydric alcohol with a (meth) acrylic acid, various (meth)acrylate compounds, N-vinylpyrrolidone, N-vinylcaprolactam, and styrene. Examples of useful oligomers include, but are not limited to, epoxy(meth) acrylates, urethane(meth)acrylates, polyester(meth) acrylates, polyether(meth)acrylates, and silicone(meth) acrylates.

Useful photopolymerization initiators are compounds having an absorption maximum in the wavelength range of 260-450 nm, including benzoin and its derivatives, benzophenone and its derivatives, acetophenone and its derivatives, Michler's ketone, benzil and its derivatives, tetralkylthiuram monosulfide, thioxanes, and the like. It is particularly preferred to use a thioxane.

From the standpoints of sliding properties and corrosion resistance, the resin layer may contain an additive selected from a lubricant and an anticorrosive additive. Examples of a lubricant are wax, metal soaps such as calcium stearate and zinc stearate, and polytetrafluoroethylene (PTFE) resin. The lubricant can be added in an amount of 0.05-0.35 parts by mass (the total amount when there are two or more) with respect to one part by mass of the ultraviolet curable resin. Examples of an anticorrosive additive are aluminum tripolyphosphate and aluminum phosphite. An anticorrosive additive can be added in an amount up to around 0.10 parts by mass with respect to one part by mass of the ultraviolet curable resin.

[Preparatory Surface Treatment]

A contact surface of a threaded joint for pipes having the above-described solid lubricating coating formed thereon can be given increased adhesion of the solid lubricating coating and increased galling resistance at the time of makeup by subjecting the contact surface to preparatory surface treatment prior to the formation of a solid lubricating coating thereon. Such preparatory surface treatment is preferably capable of roughening the contact surface to be coated with a solid lubricating coating.

Examples of suitable preparatory surface treatment are mild pickling; mechanical treatment such as sand blasting, glass peening, and shot peening; phosphate treatment such as manganese phosphate treatment or zinc phosphate treatment; zinc blasting (to form a porous zinc plating layer); and electroplating with a metal such as nickel, chromium, copper, zinc, or iron (as a result of protrusions being preferentially plated, surface irregularities are slightly increased). Any of these preparatory surface treatments can be carried out in a conventional manner. When the selected preparatory surface treatment has a large surface roughening effect as is the case with phosphate treatment, a solid lubricating coating has an increased adhesion due to the anchoring effect of the surface, so it becomes even more difficult for galling to occur.

[Undercoat Resin Layer]

In order to increase the adhesion of a solid lubricating coating formed on a contact surface of a threaded joint, an undercoat or primer resin layer may be formed on the contact surface of the threaded joint, which is either untreated or has been treated by the above-described preparatory surface treatment. Preferably, such an undercoat layer is formed on a contact surface of a threaded joint which has been treated by phosphate treatment such as zinc phosphating. Namely, the undercoat layer is formed on the phosphate coating formed by phosphate treatment. A phosphate coating is porous and provides a resin coating formed thereon with increased adhesion.

This undercoat resin layer may be formed from a thermoplastic resin, a thermosetting resin such as an epoxy resin, a polyamide, or a phenolic resin, or an ultraviolet curable resin. Most preferably it is formed from a resin of the same type as used in the formation of the solid lubricating coating, namely a modified or unmodified polyethylene (more generally an unmodified or modified polyolefin). In this case, the polymer used to form the undercoat resin layer may be exactly the same as the polymer used to form the solid lubricating coating. Alternatively, the former polymer may have a higher molecular weight than that of the latter polymer such that the undercoat resin layer does not melt during heating to form the solid lubricating coating by dissolving the polymer and the lubricating oil in each other.

The thickness of this layer is preferably in the range of 1-30 μm and more preferably in the range of 5-20 μm. The undercoat resin layer may contain one or more additives. Examples of useful additives include zinc powder, a chrome pigment, silica, colloidal silica, alumina, and the like.

When a solid lubricating coating according to the present invention is formed on the contact surface of only one of a pin and a box, the contact surface of the other member may be left untreated, or coating treatment different from that of the present invention may be carried out. Examples of other types of coating treatment are formation of a conventional solid lubricating coating (such as a resin coating containing a solid lubricant) or an anticorrosive coating (for example, a resin coating of a polyimide, an epoxy resin, or the like, optionally containing an anticorrosive additive, with an ultraviolet light curable resin coating as described above with respect to an upper resin layer being particularly preferred).

As shown in FIG. 1, in the case of a pin and a box which are previously connected to each other before shipment, even if a solid lubricating coating according to the present invention is formed on the contact surface of only one of the pin and the box and the contact surface of the other member is left untreated or given only preparatory surface treatment, sufficient galling resistance and corrosion resistance are exhibited.

Examples

The following examples are intended to specifically illustrate the present invention without limiting the invention. In the examples, unless otherwise specified, % means mass %.

In these examples, the properties of a solid lubricating coating according to the present invention are evaluated using a carbon steel plate as a substrate. Each carbon steel plate had a thickness of 0.8 mm and dimensions of 100 mm×200 mm. The carbon steel plate was used as is (with no preparatory surface treatment), or it had been subjected to preparatory surface treatment by zinc phosphate treatment (using a zinc phosphating solution sold by Nihon Parkerizing).

Various solid lubricating coatings were formed atop it by the following methods to prepare a test piece.

1) Coating with a Uniform Composition: Coating Type 1 in Table 1

EVA (ethylene-vinyl acetate copolymer) powder (average particle diameter: 50 μm, melting temperature: 90° C.) containing 10% of vinyl acetate monomer or PE (polyethylene) powder (average particle diameter: 20 μm, melting temperature: 110° C.) as an organic polymer, mineral oil as a lubricating oil, and optionally graphite powder (average particle diameter: 30 μm) as a lubricating powder were mixed in predetermined proportions to prepare coating compositions. Each coating composition was a viscous liquid having a fluidity capable of application at room temperature.

Using a doctor blade type applicator, each coating composition was applied to a carbon steel plate, which was an untreated carbon steel plate, a carbon steel plate which had been treated by zinc phosphating, a carbon steel plate having an undercoat EVA layer, or a carbon steel plate which had been treated by zinc phosphating and which had an undercoat EVA layer formed on the zinc phosphate coating. The undercoat EVA layer was a layer having a thickness of about 20 μm and comprised solely of EVA. It was formed by heating the same EVA powder as described above to about 150° C. to form a melt and applying the melt using a bar coater (No. 14) to the surface of a carbon steel plate which was either untreated or treated by zinc phosphating and which was heated to the same temperature as that of the melt.

The coated carbon steel plate was then placed into an oven and heated at 150° C. which is higher than the melting temperature of EVA or PE, and then it was allowed to cool to room temperature. The heating time was approximately 3 minutes. Prior to heating, the coated surface was tacky, but after heating, except for the case having a high content of mineral oil of 90%, a dry surface without tackiness was obtained.

When the surface of the solid lubricating coating which was formed was observed with a SEM, no particle powders of EVA or PE were observed, and it was ascertained that after the polymer (EVA or PE) melted, the polymer and the lubricating oil (mineral oil) completely dissolved in each other and formed a solid lubricating coating having a uniform and homogeneous composition of a lubricating oil-containing polymer as a matrix. The thickness of the solid lubricating coating was approximately 50 μm. In the case of a carbon steel plate having an undercoat EVA layer on the steel surface or on the zinc phosphate coating, the overall coating thickness of the undercoat layer and the solid lubricating coating was about 70 μm.

2) Coating Having a Gradient Composition: Coating Type 2 in Table 1

The same EVA powder or PE powder as described above was heated at around 150° C. to form a melt, which was used for coating. Optionally, graphite powder was added to and mixed with the polymer melt as a lubricating powder in a mass ratio of 3% with respect to the polymer. This melt was applied to a carbon steel plate which was also heated to the same temperature as the melt using a bar coater (No. 14). The carbon steel plate was an untreated carbon steel plate, a carbon steel plate which had been treated by zinc phosphating, a carbon steel plate having an undercoat EVA layer, or a carbon steel which had been treated by zinc phosphating and which had an undercoat EVA layer formed on the zinc phosphate. The undercoat EVA layer was formed in the same manner as described above in (1). The plate was then allowed to cool to room temperature to form a polymer coating. The thickness of the polymer coating was approximately 50 μm in each case.

Mineral oil (lubricating oil) was then applied atop the polymer coating on the carbon steel plate with a bar coater (No. 5), and the steel plate was heated in an oven set at 150° C. for 3 minutes and then allowed to cool to room temperature. The thickness of the applied mineral oil was approximately 20 μm (mass ratio of polymer to mineral oil=70:30). The coating surface after application of mineral oil was tacky before heating, but the surface after heating was dry with no tackiness. Thus, the applied lubricant oil dissolved in the polymer coating during heating and formed a solid lubricating coating of a lubricating oil-containing polymer. The thickness of the resulting solid lubricating coating was approximately 70 μm. In the case of a carbon steel plate having an undercoat EVA layer on the steel surface or on the zinc phosphate coating, the overall coating thickness of the undercoat layer and the solid lubricating coating was about 90 μm.

It was ascertained in the following manner that the solid lubricating coating which was formed had a gradient composition in the thickness direction in which the concentration of the mineral oil decreased and the polymer concentration increased towards the surface of the steel plate.

Using the same method as described above, a PE coating in which a tracer in the form of $TiO_2$ powder (particle diameter: 0.25 μm) was uniformly dispersed was formed to a thickness of 50 μm atop a carbon steel plate, mineral oil was applied atop the PE coating to a thickness of 20 μm, and the steel plate having the PE coating to which mineral oil was applied was heated to melt the PE coating, thereby forming a solid lubricating coating of a lubricating oil-containing polymer having a dry surface. The overall coating thickness was 70 μm.

Quantitative analysis of the tracer (the Ti in the $TiO_2$) in a cross section of the coating in the thickness direction was carried out using a SEM (scanning electron microscope)—EPMA (electron probe microanalyzer). The concentration of the tracer, which is indicative of the concentration of the polymer (PE), decreases if an oil-containing polymer is formed. There was a marked tendency for the concentration of the tracer to decrease as the distance from the outer surface of the coating decreased. The proportion of the mineral oil was calculated from the change in this concentration. The concentration of the mineral oil was around 60 mass % at a position 40 μm from the surface of the carbon steel plate, and it was around 20 mass % at a position 20 μm from the surface of the carbon steel plate, confirming the presence of a gradient composition. In the bottommost portion of the coating of a distance of 5 μm or less from the surface of the carbon steel plate, the proportion of the mineral oil was substantially 0 mass %.

For comparison, a dispersion of the EVA or PE powder in a volatile solvent (dichloromethane) was applied to a carbon steel plate and heated in the same manner as described above to form a coating of 100% EVA or PE. In addition, a steel plate having a conventional liquid grease (compound grease) applied thereto (coating thickness: 50 μm) or a conventional semi-dry solid coating (Sumifilm C2.0, coating thickness: 50 μm) applied thereto was also prepared.

The coating tackiness, the coating adhesion, the galling resistance, and the self-repairing ability of the coating were tested in the following manner for the steel plates which had undergone these lubricating treatments and were evaluated at four levels as Excellent, Good, Fair, or Poor. The test results as well as the type of coating are shown in Table 1. An evaluation of Fair or higher was acceptable.

Tackiness

A test piece cut from the steel plate which had undergone lubricating treatment was placed atop a sheet of paper with the lubricating coating facing downwards, and a weight of 1 kg was placed atop it for 1 minute. The steel test piece was then removed from the paper and the amount of lubricating coating components which had transferred to the paper was determined from the difference in the weight of the paper between before and after the test. The transferred amount ($g/m^2$) of lubricating components (primarily oil in the coating) determined in this manner was evaluated according to the following criterion:

Criterion of tackiness: transferred amount of 0 ($g/m^2$)=Excellent, at most 1=Good, greater than 1 to at most 10=Fair, greater than 10=Poor.

As can be seen from Table 1, except for the case in which the mass ratio of EVA to mineral oil was 10:90 (or the content of mineral oil was 90%), the amount of lubricating oil which oozed from the lubricating oil-containing polymer was 0-1 $g/m^2$, indicating that the coating had low tackiness and a dry surface.

The coating formed entirely of EVA which contained no lubricating oil whatsoever of course had no oozing of oil. On the other hand, in the case of a liquid grease (compound grease), the amount of oil which oozed out was an extremely large value exceeding 10 $g/m^2$ and the coating was very tacky. Accordingly, when such a coating is formed on an oil country tubular good, trash and the like can easily adhere thereto and decrease galling resistance. Even a conventional semi-dry solid lubricating coating had considerable tackiness.

Adhesion

The adhesion (peeling strength) of a portion of the solid lubricating coating formed atop the substrate steel plate was measured using a SAICAS (Surface and Interfacial Cutting Analysis System capable of precise oblique cutting). In this system, using a sharp cutting blade (monocrystalline diamond sintered alloy), the horizontal load necessary to move at a constant speed in the horizontal direction while maintaining a vertical load in a constant direction is measured to determine the peeling strength of a coating (having a thickness of approximately 1 µm). Based on the measured peeling strength, the adhesion of the coating was evaluated according to the following criterion:

Criterion of adhesion: Peeling strength (N/m) of 100 to 1000=Excellent, 10 to less than 100=Good, 1 to less than 10=Fair, 0 to less than 1=Poor.

The adhesion of a coating of pure EVA was extremely high, but even a solid lubricating coating of Type 1 in which the lubricating oil-containing polymer had a uniform composition exhibited good adhesion.

In the case of a solid lubricating coating of Type 2 in which the lubricating oil-containing polymer had a gradient composition such that the polymer concentration increased (and such that the lubricating oil concentration decreased) towards the steel plate, the adhesion was substantially the same as the adhesion of a coating formed entirely of PE or EVA.

Figure 5:
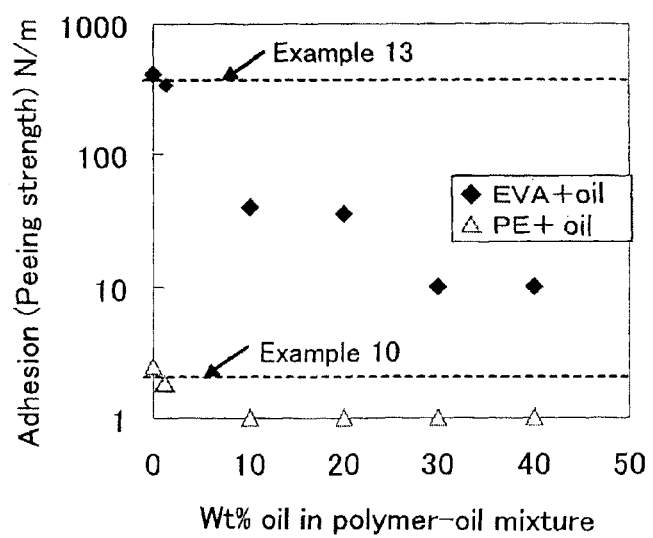
FIG. 5 is a graph showing the adhesion (peeling strength) measured by the SAICAS (Surface And Interfacial Cutting Analysis System) method of a solid lubricating coating of a lubricating oil-containing polymer formed from a liquid mixture of PE (polyethylene) or EVA (ethylene-vinyl acetate copolymer) and mineral oil as a function of the oil content in the liquid mixture.

FIG. 5 shows the results of measurement of peeling strength which was determined in the above-described manner for the case in which a mixture of EVA or PE with mineral oil which was added in the proportion 1, 10, 20, 30, or 40% was applied to an untreated carbon steel plate in the same manner as described above with respect to a Type 1 coating to form a solid lubricating coating of a lubricating oil-containing polymer (coating type 1). It also shows the result for a solid lubricating coating of a lubricating oil-containing polymer formed by applying mineral oil atop a PE or EVA coating and heating it (coating type 2, Examples 8 and 9) as well as the result for 100% PE or EVA (0% mineral oil). When the organic polymer was EVA which contains polar groups, even when the coating contained a lubricating oil (mineral oil), the adhesion of the coating was markedly improved compared to that of a coating consisting only of PE, which does not contain polar groups. Accordingly, with a coating of Type 1 having a uniform composition in which a lubricating oil (mineral oil) is uniformly distributed in a solid lubricating coating, the polymer needs to be a modified polyethylene having excellent adhesion (such as EVA in the present example) due to the presence of polar groups.

On the other hand, with a coating of type 2 having a gradient composition, the composition of the coating in the vicinity of the substrate steel plate was close to 100% PE or EVA, so it exhibited an adhesion which was nearly on the same level as that for 100% PE or EVA (0% mineral oil). Therefore, for a solid lubricating coating having a gradient composition, an unmodified polyethylene such as EP can be used as a polymer. However, as shown in Table 1, the adhesion of the coating was markedly increased when the polymer was EVA which is a modified polyethylene.

Self-Repairing Ability, Galling Resistance of Peeled Portions:

If a solid lubricating coating formed on a contact surface of a threaded joint is subjected to a load and a frictional force caused by the opposing member of the joint, the coating may undergo damage in the form of peeling and abrasion of the coating (the formation of shavings of the coating) when the load and frictional force become large. This damage worsens lubricating properties and makes it easy for galling to occur. When a solid lubricating coating has a self-repairing ability, even if the coating is damaged, while the damage is small, lubricating properties are maintained by oil which oozes from the remaining coating, and galling does not take place.

Figure 3:
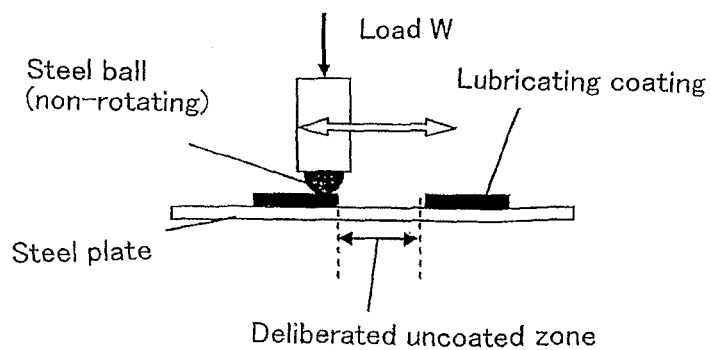
FIG. 3 is a schematic view of a Bauden friction test with a coated test piece having a damaged portion which is deliberately formed in the coating.
Figure 4:
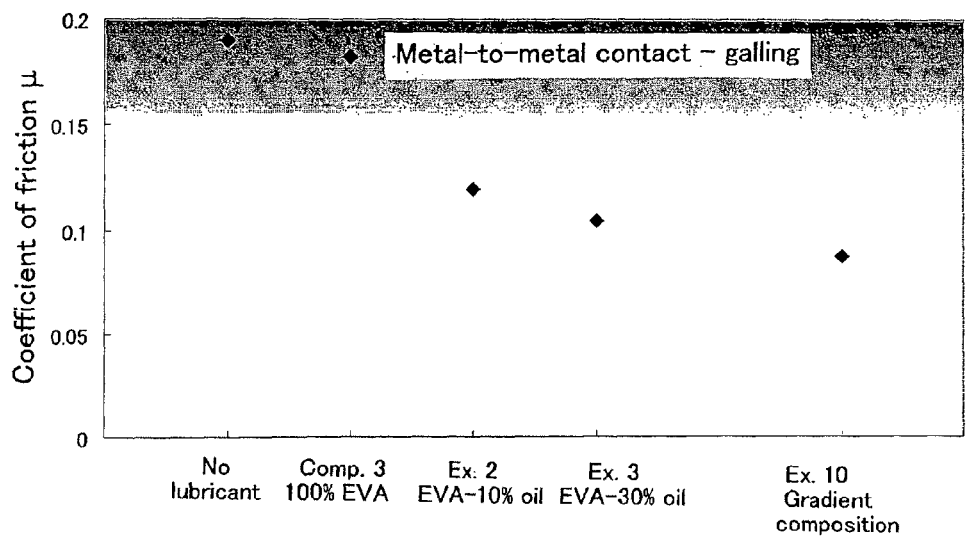
FIG. 4 is a graph showing the initial coefficient of friction ($\mu$) of a damaged portion of a solid lubricating coating of a lubricating oil-containing polymer (EVA containing a different amount of mineral oil as a lubricant or having a gradient composition) and that of a coating without a lubricant or a coating of 100% EVA.

In order to simulate a damaged state, a steel plate coated with a solid lubricating coating having a deliberately uncoated zone with a thickness of 5 mm was prepared by applying a piece of self-adhesive tape having a width of 5 mm along the centerline of a carbon steel plate, then forming a solid lubricating coating in the same manner as described above atop the steel plate except the zone having a width of 5 mm which was masked by the tape. The piece of tape was removed from the steel plate to expose an uncoated zone at the center of the plate, which simulated a damaged portion of a lubricating coating. A Bauden friction test of the steel plate was then carried out in the manner shown in FIG. 3. A non-rotating steel ball was placed atop the coating, a load W was applied to the steel ball in a direction normal to the surface of the steel plate, and the steel ball was made to slide back and forth across the central exposed uncoated zone in its widthwise direction. The coefficient of friction experienced during sliding and the number of times that sliding was performed until galling occurred were measured to evaluate the self-repairing ability and galling resistance of the coating.

Galling resistance was evaluated according to the following criterion based on the number of times that sliding was performed until galling occurred in the Bauden friction test. It was determined that galling had occurred when the coefficient of friction exceeded 0.18.

Criterion of galling resistance: sliding for more than 20 times=Excellent, greater than 10 times to at most 20 times=Good, greater than 5 times to at most 10 times=Fair, and 0 times to at most 5 times=Poor.

The self-repairing ability was evaluated by the coefficient of friction immediately after the start of sliding based on the following criterion:

Criterion of self-repairing ability: coefficient of friction of less than 0.1=Excellent, 0.1 to less than 0.13=Good, 0.13 to less than 0.15=Fair, at least 0.15=Poor.

TABLE 1

| Example No. | Coating type | Polymer (%) | Lubricant oil (%) | Preparatory surface treatment | Undercoat resin layer | Tackiness | Adhesion (peeling strength) | Self-repairing ability | Galling resistance of peeled zone |
|---|---|---|---|---|---|---|---|---|---|
| Ex. 1 | 1 | EVA (95) | MO (5) | — | — | Excel | Good | Fair | Fair |
| Ex. 2 | 1 | EVA (90) | MO (10) | — | — | Excel | Good | Good | Good |
| Ex. 3 | 1 | EVA (70) | MO (30) | — | — | Excel | Good | Good | Good |
| Ex. 4 | 1 | EVA (70) | MO (30) | zinc phosphate | — | Excel | Good | Good | Excel |
| Ex. 5 | 1 | EVA (70) | MO (30) | — | EVA | Excel | Excel | Good | Good |
| Ex. 6 | 1 | EVA (70) | MO (30) | zinc phosphate | EVA | Excel | Excel | Good | Excel |
| Ex. 7 | 1 | EVA/3% graphite (68.5) | MO (28.5) | — | — | Excel | Good | Good | Excel |
| Ex. 8 | 1 | EVA (30) | MO (70) | — | — | Good | Good | Good | Good |
| Ex. 9 | 1 | EVA (10) | MO (90) | — | — | Fair | Fair | Excel | Excel |
| Ex. 10 | 2 | PE | MO | — | — | Good | Fair | Excel | Excel |
| Ex. 11 | 2 | PE | MO | — | EVA | Good | Excel | Excel | Excel |
| Ex. 12 | 2 | PE | MO | zinc phosphate | EVA | Good | Excel | Excel | Excel |
| Ex. 13 | 2 | EVA | MO | — | — | Good | Excel | Excel | Excel |
| Ex. 14 | 2 | EVA | MO | zinc phosphate | — | Good | Excel | Excel | Excel |
| Ex. 15 | 2 | EVA/3% graphite | MO | — | — | Good | Excel | Excel | Excel |
| Comp. 1 | 1 | PE (90) | MO (10) | — | — | Excel | Poor | Good | Fair |
| Comp. 2 | — | PE (100) | — | — | — | Excel | Fair | Poor | Poor |
| Comp. 3 | — | EVA (100) | — | — | — | Excel | Excel | Poor | Poor |
| Conv. 1 | Compound grease (viscous liquid grease) | | | | | Poor | — | Excel | Excel |
| Conv. 2 | Sumifilm C2.0 (semi-dry solid coating) | | | | | Fair | — | Excel | Excel |

Ex. = Example,
Comp. = Comparative Example,
Conv. = Conventional Example;
Coating type: 1 = uniform composition,
2 = gradient composition;
EVA: Ethylene-vinyl acetate copolymer;
PE: Polyethylene,
MO = mineral oil;
Tackiness: Transferred amount (g/m$^2$) of 0 = Excellent, greater than 0 to at most 1 = Good, reater than 1 to at most 10 = Fair, greater than 10 = Poor;
Adhesion: Peeling strength (N/m) of 100 to 1000 = Excellent, 10 to less than 100 = Good, 1 to less than 10 = Fair, 0 to less than 1 = Poor;
Self-repairing ability: Coefficient of friction of less than 0.1 = Excellent, 0.1 to less than 0.13 = Good, 0.13 to less than 0.18 = Fair, 0.18 or higher = Poor;
Galling resistance: Greater than 20 sliding cycles = Excellent, greater than 10 to at most 20 cycles = Good, greater than 5 to at most 10 cycles = Fair, 0 to 5 cycles = Poor.

As shown in Table 1, with a coating formed solely of EP or EVA and not containing lubricating oil, there was no self-repairing ability whatsoever and galling resistance was extremely poor. In contrast, even though a solid lubricating coating according to the present invention was a solid, due to the presence of mineral oil in the coating, the coating exhibited a good self-repairing ability and galling resistance if the content of mineral oil was at least 10 mass %. In addition, a solid lubricating coating of a lubricating oil-containing polymer having a high content of an organic polymer at the contact surface and having a lubricating oil content which decreased towards the outer surface of the coating exhibited an extremely good self-repairing ability and galling resistance. Furthermore, when the surface of the steel plate was roughened by manganese phosphate treatment or when the solid lubricating coating contained a small amount of a powder of a solid lubricant in addition to mineral oil, a high degree of galling resistance could be obtained. The formation of an undercoat EVA layer could increase the adhesion of the solid lubricating coating formed thereon of Type 1 and particularly of Type 2 in which the polymer was PE.

As described above, according to the present invention, by forming a solid lubricating coating which is essentially a solid but which has a self-repairing ability on a contact surface of a threaded joint for pipes, surface tackiness and resulting adhesion of refuse are suppressed, and galling resistance can be imparted to the contact surface. As a result, even if makeup and breakout of oil country tubular goods take place many times, galling of a threaded joint for pipes can be prevented, and galling resistance comparable to that of a compound grease can be imparted to the threaded joint without using a compound grease which worsens the environment and working efficiency.

The invention claimed is:

1. A threaded joint for pipes comprising a pin and a box each having a contact surface including a threaded portion and an unthreaded metal contact portion, characterized in that the contact surface of at least one of the pin and the box is coated with a solid lubricating coating having a matrix of a lubricating oil-containing polymer comprising a polyolefinic polymer selected from a polyolefin and a modified polyolefin and a lubricating oil which are dissolved in each other, the lubricating oil-containing polymer having a gradient composition in which the concentration of lubricating oil in the coating decreases towards the contact surface on which the coating is formed in the thickness direction of the coating.

2. A threaded joint for pipes as set forth in claim 1 wherein the polyolefin is polyethylene, and the modified polyolefin is polyethylene modified by copolymerization with a vinyl monomer having a polar group selected from carboxyl, ester, and hydroxyl groups.

3. A threaded joint for pipes as set forth in claim 1 wherein mass ratio (A:B) of the polyolefinic polymer (A) and the lubricating oil (B) forming the lubricating oil-containing polymer is in the range of 50:50-90:10.

4. A threaded joint for pipes as set forth in claim 3 wherein the concentration of lubricating oil in the matrix of the solid lubricating coating in a region up to 1 μm in the thickness direction from the contact surface of the joint is less than 1 mass %.

5. A threaded joint for pipes as set forth in claim 1 wherein the solid lubricating coating contains at least one additive selected from an anticorrosive additive, an antioxidant, an extreme pressure agent, a wear reducing agent, and a lubricating powder.

6. A threaded joint for pipes as set forth in claim 1 wherein the contact surface which is coated with the solid lubricating coating is previously subjected to preparatory surface treatment by a method selected from pickling, blasting, impact plating with zinc or a zinc alloy, metal plating, phosphating, and oxalate treatment.

7. A threaded joint for pipes as set forth in claim 1 wherein the contact surface has an undercoat resin layer on which the solid lubricating coating is formed.

8. A threaded joint for pipes as set forth in claim 6 wherein the contact surface which has been subjected to the preparatory surface treatment has an undercoat resin layer on which the solid lubricating coating is formed.

9. A method of manufacturing a threaded joint for pipes as set forth in claim 1 in which the lubricating oil-containing polymer has a gradient composition in which the concentration of lubricating oil decreases towards the contact surface, characterized by comprising the steps of forming a coating of a polyolefinic polymer selected from a polyolefin and a modified polyolefin on a contact surface of a threaded joint for pipes, applying a lubricating oil atop the coating of a polyolefinic polymer, and heating the contact surface to a temperature of not lower than the melting point of the polyolefinic polymer to dissolve the lubricating oil and the polyolefinic polymer in each other and form a lubricating oil-containing polymer having a gradient composition in which the concentration of the lubricating oil decreases towards the contact surface on which the solid lubricating coating is formed.

10. A method as set forth in claim 9 wherein the coating of a polyolefinic polymer contains at least one additive selected from an anticorrosive additive, an antioxidant, an extreme pressure agent, a wear reducing agent, and a lubricating powder.

11. A method as set forth in claim 9 wherein the contact surface is previously subjected to preparatory surface treatment by a method selected from pickling, blasting, impact plating with zinc or a zinc alloy, metal plating, phosphating, and oxalate treatment.

12. A method as set forth in claim 9 wherein the contact surface has an undercoat resin layer on which the solid lubricating coating is to be formed.

13. A method as set forth in claim 11 wherein the contact surface which has been subjected to the preparatory surface treatment has an undercoat resin layer on which the solid lubricating coating is to be formed.

* * * * *